United States Patent
Arai

[11] Patent Number: 5,797,819
[45] Date of Patent: Aug. 25, 1998

[54] RESIN PULLEY

[75] Inventor: Hirokazu Arai, Yamato-Kohriyama, Japan

[73] Assignee: Sumitomo Bakelite Company, Limited, Shinagawa-ku, Japan

[21] Appl. No.: 797,335

[22] Filed: Feb. 10, 1997

[30] Foreign Application Priority Data

Feb. 14, 1996 [JP] Japan .................. 8-052356

[51] Int. Cl.$^6$ ........................................ F16H 55/06
[52] U.S. Cl. .................. 474/161; 474/166; 474/178; 474/190
[58] Field of Search ................... 474/161, 166, 474/177, 178, 190

[56] References Cited

U.S. PATENT DOCUMENTS

| | | | |
|---|---|---|---|
| 4,660,435 | 4/1987 | Davis et al. | 74/572 |
| 4,913,688 | 4/1990 | Bekheet. | |
| 5,031,711 | 7/1991 | Tanaka et al. | 180/7.1 |
| 5,120,279 | 6/1992 | Rabe. | |
| 5,361,883 | 11/1994 | Yamamoto | 192/84 |
| 5,507,698 | 4/1996 | Kuribayashi | 474/170 |
| 5,728,343 | 3/1998 | Ueno | 264/275 |

FOREIGN PATENT DOCUMENTS

| | | |
|---|---|---|
| 1 910 757 | 6/1970 | Germany. |
| 63-235766 | 9/1988 | Japan. |

*Primary Examiner*—John P. Darling
*Assistant Examiner*—Emmanuel M. Marcelo
*Attorney, Agent, or Firm*—Reid & Priest LLP

[57] ABSTRACT

A resin pulley was made of a resin material wherein an inorganic fiber such as glass fiber, an inorganic powder such as silica powder, an organic fiber such as cotton cloth fiber, and an elastomer are blended in a phenol resin.

Each content of the inorganic fiber, inorganic powder, organic fiber and elastomer in the above resin material is within the following range.

Inorganic fiber: 25–45% by weight

Inorganic powder: 3–7% by weight

Organic fiber: 3–7% by weight

Elastomer: 3–10% by weight

6 Claims, 2 Drawing Sheets

RESIN PULLEY

BACKGROUND OF THE INVENTION

The present invention relates to a resin pulley which is incorporated into, for example, an engine of automobiles.

With the progress of miniaturization/lightening and cost reduction of automobile parts, pulleys (e.g. pulley with teeth, V-pulley, etc.), which have exclusively been made of a metal, heretofore, have recently been replaced by pulleys made of a resin.

The above resin pulley is that in which a ring resin pulley body is normally fit to the outer surface of a metal boss. As the above resin pulley body, those which are made of a resin material prepared by blending fillers in a phenol resin as a matrix are mainly used.

However, a resin pulley body comprising a phenol resin as a matrix (hereinafter referred to as a "resin pulley", merely) has a problem that wear formed during the use is heavy in an atmosphere where dust exists and it's durability is inferior to that of a conventional metal pulley.

The above conventional resin pulley comprising a phenol resin as a matrix has a problem that a crack initiates when using in an atmosphere where cooling and heating are repeated because of small thermal shock resistance (TSR). It is considered that crack initiation is caused by the following reason. That is, when a tensile strength is improved by blending fillers such as glass fiber, carbon fiber, etc. in a phenol resin, Young's modulus increases with the increase of this tensile strength. There is a relationship between thermal shock resistance (TSR) and Young's modulus, which is represented by the following formula (1). When Young's modulus increase, TSR decreases and, therefore, a crack is liable to initiate due to a thermal shock.

$$TSR=(S.\lambda)/(E.\alpha) \qquad (1)$$

S: tensile strength
$\lambda$: thermal conductivity
E: Young's modulus
$\alpha$: linear expansion coefficient Regarding the resin pulley, the ring resin pulley body is fit into the metal boss as described above. Therefore, there arose a problem that, when using in the atmosphere where heating and cooling are repeated, a stress caused by not only a heat shock but also a difference in thermal expansion coefficient between the metal boss and resin pulley body is applied to the resin pulley body so that a crack is liable to initiate in the resin pulley body.

OBJECT AND SUMMARY OF THE INVENTION

It is a main object of the present invention to provide a resin pulley which is superior in wear resistance and is capable of withstanding a thermal shock.

It is another object of the present invention to provide a resin pulley wherein a crack will hardly initiate when using in an atmosphere where heating and cooling are repeated.

The resin pulley of the present invention is made of a resin material wherein an inorganic fiber, an inorganic powder, an organic fiber and an elastomer are blended in a phenol resin.

In the resin pulley of the present invention, the surface hardness can be increased by blending an inorganic filler such as inorganic fiber, etc. in a phenol resin. The wear resistance can also be improved by blending the inorganic powder to modify the surface state. The heat shock resistance can be further improved by blending the organic fiber and elastomer to reduce Young's modulus without decreasing the tensile strength.

That is, when the resin pulley is cooperated into the engine of the automobile, dust as the cause for wear is mainly composed of a silica substance. Therefore, a surface hardness is improved by blending an inorganic filler having the same hardness as or hardness higher than that of the silica substance, thereby improving the wear resistance.

With respect to the surface of a molded material comprising a resin material filled with inorganic fibers, when a diameter of dust is smaller than that of the inorganic fiber, dust invades into spaces between the inorganic fibers and the resin part wears. Accordingly, the wear resistance can be further improved by using an inorganic powder having a small particle diameter as the filler. Therefore, it is preferred to use the inorganic powder having a particle size smaller than that of the inorganic fiber in the resin pulley of the present invention.

Since wear due to dust is considered to be a micro-destruction of the surface of the molded article caused by extremely local stress concentration, it becomes possible to disperse the stress by adding the elastomer to reduce an elastic modulus. Accordingly, the elastomer is useful for not only improvement in heat shock resistance but also improvement in wear resistance. The organic fiber such as cotton cloth fiber also serve to modify the surface state of the molded material and to reduce elastic modulus. Accordingly, it is necessary to use the elastomer and organic fiber having an elastic modulus smaller than that of the above inorganic fiber and inorganic powder in the present invention.

In the present invention, any one of the novolak type phenol resin and resol type phenol resin may be used, and they may be used in combination.

In one preferred mode, regarding the resin pulley of the present invention, each content of the inorganic fiber, inorganic powder, organic fiber and elastomer in the resin material is within the following range.

inorganic fiber: 25–45% by weight
inorganic powder: 3–7% by weight
organic fiber: 3–7% by weight
elastomer: 3–10% by weight In the resin pulley of the present invention, the wear resistance and heat shock resistance can be certainly improved by blending the respective components within the above range.

The reason why the content of the inorganic fiber is within the range from 25 to 45% is as follows. That is, when the content of the inorganic fiber is less than 25% by weight, the strength becomes small. On the other hand, when the content exceeds 45% by weight, the attacking property to the opponent member (e.g. belt, etc.) becomes large and, therefore, it is not preferred.

The reason why the content of the inorganic powder is within the range from 3 to 7% by weight is as follows. That is, when the content of the inorganic powder is less than 3% by weight, it is insufficient to prevent the resin part between the inorganic fibers of the surface of the resin pulley from wearing. On the other hand, when the content exceeds 7% by weight, the effect is saturated.

The reason why the content of the organic fiber is within the range from 3 to 7% by weight is as follows. That is, when the content of the organic fiber is less than 3% by weight, it becomes impossible to efficiently improve the heat shock resistance. On the other hand, when the content exceeds 7% by weight, the strength is lowered.

The reason why the content of the elastomer is within the range from 3 to 10% by weight is as follows. That is, when the content of the elastomer is less than 3% by weight, the effect of imparting a flexibility is small. On the other hand, when the content exceeds 10% by weight, the strength is lowered and, therefore, it is not preferred.

In another preferred mode, regarding the resin pulley of the present invention, the above inorganic fiber is a glass fiber and the inorganic powder is a silica powder and, further, the organic fiber is a cotton cloth fiber.

In such way, it becomes possible to efficiently improve the wear resistance and heat shock resistance by using the material wherein the above respective components are blended in the phenol resin, thereby making the present invention more effective.

It is preferred that the above elastomer is at least one sort selected from the group consisting of nitrile rubber, styrene-butadiene rubber, chloroprene rubber and ethylene-propylene rubber.

It becomes possible to certainly reduce Young's modulus without decreasing the tensile strength by using the above substance as the elastomer, thereby making it possible to certainly improve the heat shock resistance.

The resin pulley of the present invention may be made by insert-molding the above resin material. In this mode, the resin pulley of the invention may be made by insert-molding the above resin material on the outer periphery of a metal boss.

DETAILED DESCRIPTION OF THE PREFERRED EMBODIMENT

Hereinafter, the present invention will be explained in detail with reference to the accompanying drawings illustrating the preferred embodiment of the present invention.

First, a molding resin was prepared by adding a silica powder, a glass fiber, a cotton cloth fiber and an elastomer (nitrile rubber) to a phenol resin as a base resin, followed by kneading.

| | |
|---|---|
| i. Glass fiber (diameter: 13 μm) | 40.0% by weight |
| ii. Silica powder (average particle diameter:10 μm) | 5.0% by weight |
| iii. Cotton cloth fiber | 5.0% by weight |
| iv. Elastomer (nitrile rubber) | 5.7% by weight |
| v. Phenol resin (novolak type) | balance |

Figure 1:
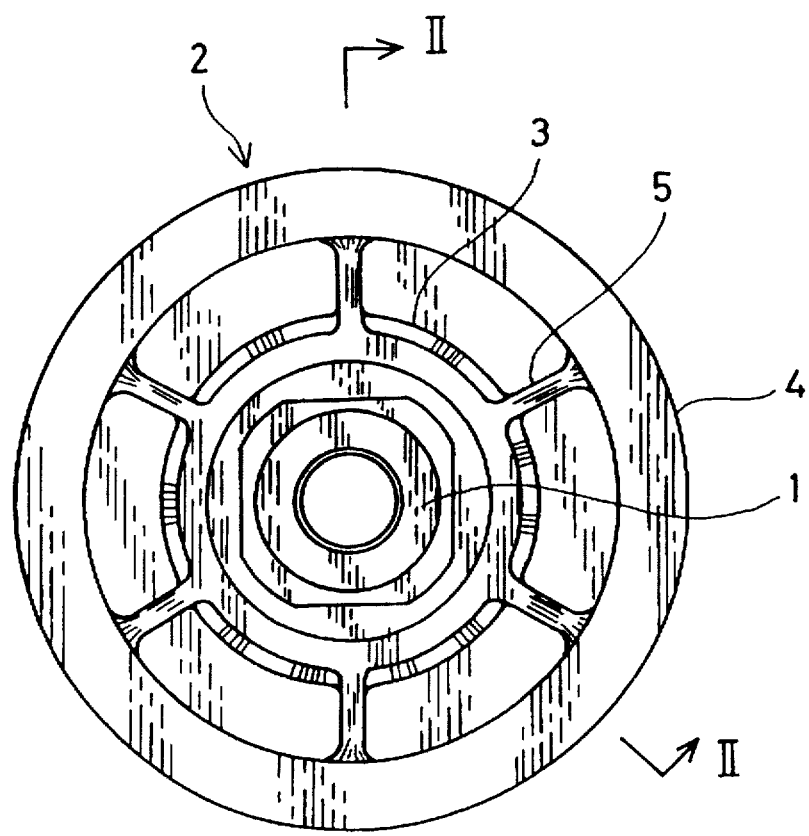
FIG. 1 is a front view illustrating the structure of the resin pulley in accordance with one embodiment of the present invention.
Figure 2:
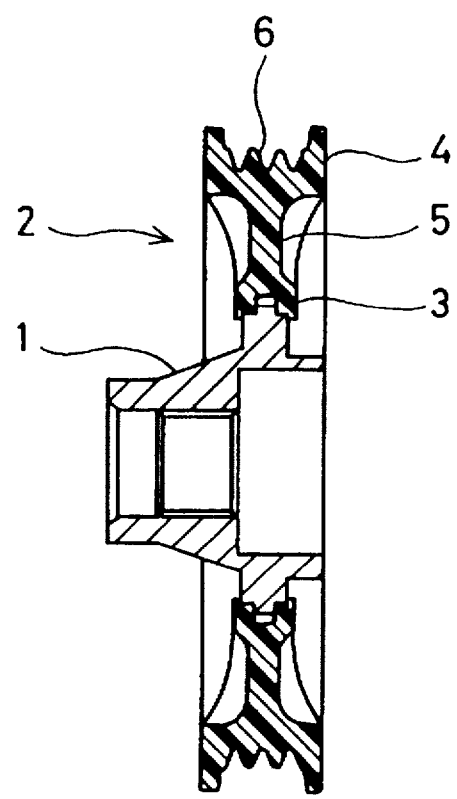
FIG. 2 is a cross-sectional view taken in the line II—II of FIG. 1.

A resin pulley wherein a ring resin pulley body 2 is fit to the outer periphery of a metal boss 1, as shown in FIG. 1 and FIG. 2, was obtained by insert-molding the above molding resin. The resin pulley body 2 constituting this resin pulley has the structure wherein the fitting part 3 for fitting to the boss 1 is combined with the outer cylinder part 4 through a rib 5, and a groove 6 (FIG. 2) into which a belt is fit is formed on the peripheral part.

For comparison, a resin pulley was produced by using the followings:

i. molding resin wherein 55% by weight of a glass fiber is blended in a phenol resin (Comparative Example 1), ii. molding resin wherein 50% by weight of a glass fiber and 15% by weight of an elastomer are blended in a phenol resin (Comparative Example 2), and iii. molding resin wherein 32% by weight of a cotton cloth fiber, 10% by weight of calcium carbonate and 5% by weight of a wood flour are blended in a phenol resin (Comparative Example 3).

A belt attacking property and a wear amount of the resin pulley when using the resin pulley in accordance with the embodiment of the present invention (Example) and resin pulleys produced by using the molding resins of Comparative Examples 1, 2 and 3, as a pulley for power steering pump of automobiles, were examined. The results are shown in Table 1.

The belt attacking property in Table 1 is determined by evaluating the degree of damage to a belt by the resin pulley according to criteria "large", "medium" and "small". "Large" indicates that the degree of damage to the belt is large, while "small" indicates that the degree of damage to the belt is small. "Medium" indicates that the degree of damage is intermediate between "large" and "small".

The "wear amount of the pulley" indicates an amount of wear (amount of wear formed in radial direction from peripheral surface) of the resin pulley body 2 (see FIG. 1 and FIG. 2) formed after testing for 200 hours.

TABLE 1

| | Base resin | Kind and Blend proportion of filler | Belt attacking property | Wear amount of pulley (mm) |
|---|---|---|---|---|
| Comparative Example 1 | Phenol resin | Glass fiber (55.0% by weight) | Large | 0.30 |
| Comparative Example 2 | Phenol resin | Glass fiber (50.0% by weight) Elastomer (15.0% by weight) | Medium | 0.34 |
| Comparative Example 3 | Phenol resin | Cotton cloth fiber (32.0% by weight) Calcium carbonate (10.0% by weight) Wood flour (5.0% by weight) | Small | 0.40 |
| Example | Phenol resin | Glass fiber (40.0% by weight) Powdered silica (5.0% by weight) Cotton cloth fiber (5.0% by weight) Elastomer (5.7% by weight) | Small | 0.20 |

As is apparent from Table 1, in case of Comparative Example 1 using the molding resin containing no elastomer, the belt attacking property is large and the wear amount of the pulley is large. Therefore, it is not preferred. In case of Comparative Example 2 using the molding resin, which contains the elastomer but does not contain the inorganic powder and organic fiber, the belt attacking property exhibits the degree "medium" but the wear amount of the pulley is large. Therefore, it is not preferred. In case of Comparative Example 3 using the molding resin containing the cotton cloth fiber, calcium carbonate and wood flour, the belt attacking property becomes small but the wear amount of the pulley is large. Therefore, it is not preferred.

To the contrary, in case of Example using the molding resin containing the glass fiber, silica powder, cotton cloth fiber and elastomer (nitrile rubber), it is found that the belt attacking property is small and the wear amount of the pulley becomes small.

In the above embodiment, the case of using the glass fiber as the inorganic fiber, silica powder as the inorganic powder, cotton cloth fiber as the organic fiber and nitrile rubber as the elastomer was explained, however, the respective fillers are not limited to the above examples. It is possible to use a carbon fiber and a whisker of carbon or potassium titanate as the inorganic fiber. It is also possible to use calcium carbonate as the inorganic powder. In that case, the fundamental effect of the present invention can be obtained.

In the above embodiment, the case of using the novolak type phenol resin as the phenol resin was explained, however, a resol type phenol resin can also be used.

Furthermore, the organic fiber is not limited to the cotton cloth fiber, and it is also possible to use cloth tip, aromatic polyamide fiber and the like.

The elastomer is not limited to the above nitrile rubber, and it is possible to use styrene-butadiene rubber, chloroprene rubber, ethylene-propylene rubber and the like. It is also possible to use other substances.

In the above embodiment, the example of a power steering pulley was explained as the resin pulley for automobile part. The resin pulley of the present invention can also be applied to other pulleys for automobile part, such as tensioner pulley, idler pulley and the like, in addition to the above power steering pulley. Furthermore, the resin pulley of the present invention is not limited to a pulley for automobile part and can be utilized in other various industrial fields.

In the above embodiment, the example of the resin pulley having the structure wherein the resin pulley body is fit to the periphery of the metal boss was explained, however, the present invention is not limited to those wherein the metal boss and resin pulley body are combined. It is possible to apply to a pulley using a steel roller bearing in place of the above metal boss. It is also possible to apply to a pulley whose whole body is made of a resin. In both cases, the same effect as that in case of the above embodiment can be obtained.

The present invention is not limited to the above embodiment in other respects, and various applications and modifications can be made with respect to the blend proportion of the respective fillers, molding method of the resin, etc. within the scope of the present invention.

What is claimed is:

1. A resin pulley comprising a resin material wherein an inorganic fiber, an inorganic powder, an organic fiber and an elastomer are blended in a phenol resin.

2. The resin pulley according to claim 1, wherein each content of the inorganic fiber, inorganic powder, organic fiber and elastomer in the resin material is within the following range Inorganic fiber: 25–45% by weight Inorganic powder: 3–7% by weight Organic fiber: 3–7% by weight Elastomer: 3–10% by weight.

3. The resin pulley according to claim 1, wherein the inorganic fiber is a glass fiber and the inorganic powder is a silica powder and, further, the organic fiber is a cotton cloth fiber.

4. The resin pulley according to claim 1, wherein the elastomer is at least one sort selected from the group consisting of nitrile rubber, styrene-butadiene rubber, chloroprene rubber and ethylene-propylene rubber.

5. The resin pulley according to claim 1, which is made by insert-molding the resin material.

6. The resin pulley according to claim 1, which is made by insert-molding the resin material on the outer periphery of a metal boss.

* * * * *

UNITED STATES PATENT AND TRADEMARK OFFICE
CERTIFICATE OF CORRECTION

PATENT NO. : 5,797,819
DATED : 25 August 1998
INVENTOR(S) : Hirokazu ARAI

It is certified that error appears in the above-identified patent and that said Letters Patent is hereby corrected as shown below:

On the title page, item[73]:

Under "Assignee",

"Sumitomo Bakelite Company Limited, Shinagawa-ku, Japan" should read --Koyo Seiko Co., Ltd., Chuo-Ku, Osaka, Japan and Sumitomo Bakelite Company Limited, Shinagawa-Ku, Tokyo, Japan--.

Signed and Sealed this

Fifteenth Day of June, 1999

Attest:

Q. TODD DICKINSON

Attesting Officer

Acting Commissioner of Patents and Trademarks